April 23, 1968

C. R. NORRIS ET AL 3,380,064

AUTOMATIC UTILITIES BILLING SYSTEM

Filed Oct. 7, 1965

INVENTOR.
CLAUDE R. NORRIS
NORMAN F. PRATT
BY

ATTORNEYS

April 23, 1968 C. R. NORRIS ET AL 3,380,064
AUTOMATIC UTILITIES BILLING SYSTEM
Filed Oct. 7, 1965 7 Sheets-Sheet 3

INVENTOR.
CLAUDE R. NORRIS
NORMAN F. PRATT
BY
ATTORNEYS

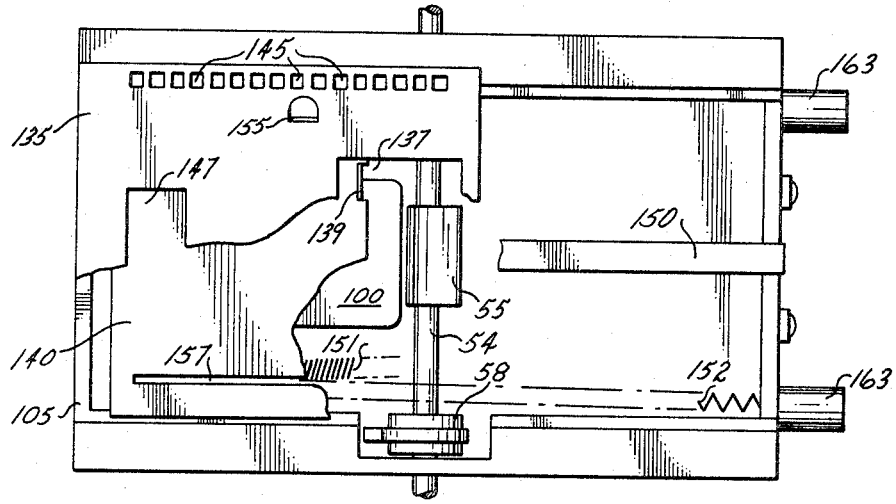
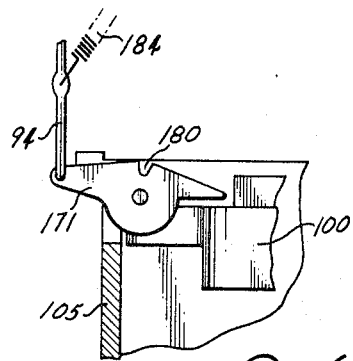
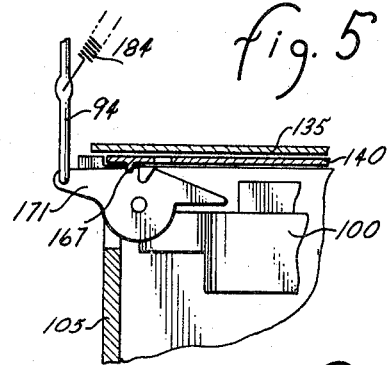
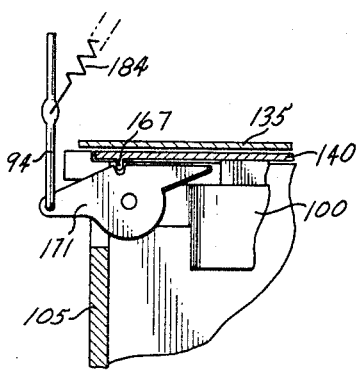
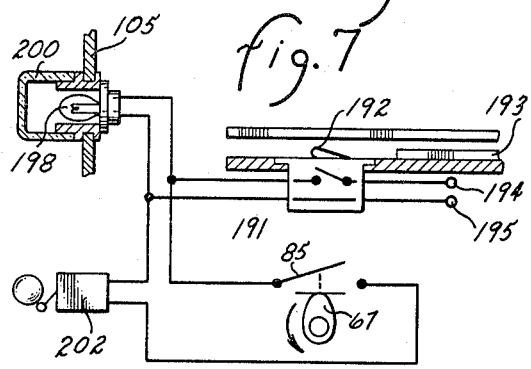

April 23, 1968  C. R. NORRIS ETAL  3,380,064
AUTOMATIC UTILITIES BILLING SYSTEM
Filed Oct. 7, 1965  7 Sheets-Sheet 5

INVENTOR.
CLAUDE R. NORRIS
NORMAN F. PRATT
BY

ATTORNEYS

April 23, 1968    C. R. NORRIS ET AL    3,380,064
AUTOMATIC UTILITIES BILLING SYSTEM
Filed Oct. 7, 1965    7 Sheets-Sheet 6

INVENTOR.
CLAUDE R. NORRIS
NORMAN F. PRATT
BY
ATTORNEYS

April 23, 1968  C. R. NORRIS ET AL  3,380,064
AUTOMATIC UTILITIES BILLING SYSTEM
Filed Oct. 7, 1965  7 Sheets-Sheet 7

INVENTOR.
CLAUDE R. NORRIS
NORMAN F. PRATT
BY

ATTORNEYS

United States Patent Office 3,380,064
Patented Apr. 23, 1968

3,380,064
AUTOMATIC UTILITIES BILLING SYSTEM
Claude R. Norris, 8226 E. Clinton St., Scottsdale, Ariz. 85251, and Norman F. Pratt, Scottsdale, Ariz.; said Pratt assignor to said Norris
Filed Oct. 7, 1965, Ser. No. 493,683
3 Claims. (Cl. 346—17)

The present invention pertains to systems for reading and recording the utilities consumed by a user and for billing the user for the value of those quantities; more specifically, the present invention pertains to utility billing apparatus which automatically reads, records, and bills the utility user for the quantity of the utility measured by the device.

The expansion of utility systems and the general growth experienced throughout the country in utility-using dwellings has resulted in a significant bottleneck in the procedure for billing users for utilities consumed. The present method consists of the exceedingly inefficient use of meter readers who physically visit each user's location once every month. The meters are read and the values recorded in a record book by the reader. The record book is then returned and is used as source material for the manual preparation of invoices to be sent to the respective users. Although the present method of reading, recording, and billing for utilities is the same method that has been used since power, gas and water companies have installed meters, attempts to automate or improve the system have generally failed.

Some attempts at solving this dilemma have included the utilization of a printing device carried by the meter reader to actually prepare the final invoice at the time the meter is read. The principal objection to the prior art nevertheless remains since it would still be necessary for the reader to physically visit each user location. Several other attempts have been made to automate the billing procedure and have included complicated and expensive telemetering systems that would transmit signals indicating the quantity of the utility used to a central location to there be translated into printed records. The expense of such systems clearly militates against their use. A less frequent period for meter reading may also be used to reduce the administrative expense of billing for utilities; however, by increasing the length of time between each billing, the utility company must then "carry" or finance the generation and delivery of the utility over a greater length of time. This latter approach would require substantial capital outlays and would result in additional capital investment for the same return. Increasing the time between meter readings also increases the percentage of uncollectable accounts since the increased period of time between billings renders the system less "sensitive" to users that are delinquent.

Other attempts have been made such as the utilization of user-read records wherein the user, at a predetermined monthly time, would read his own meter and send the information to the utility. The unreliability of such a method coupled with the difficulty experienced by many unskilled readers in obtaining a meaningful reading from a utility meter have clearly indicated that this system is not feasible.

It is therefore an object of the present invention to provide a utilities billing system that will automatically present a bill to the utility user without the intermediate step of manually reading the utility meter.

It is also an object of the present invention to provide an automatic utilities billing system that will present an invoice to a utility user at predetermined intervals.

It is still another object of the present invention to provide an automatic utilities billing system that will utilize a conventional utility meter as a source for input signals and will accumulate these signals, translate signals to an indication of the monetary value of the consumed utilities, and ultimately print an invoice to the utility user.

These and other objects of the present invention will become apparent to those skilled in the art as the description thereof proceeds.

Briefly, in accordance with one embodiment of the present invention, an automatic utilities billing system is connected to a slightly modified conventional utility meter. The utility meter is modified to provide an electrical signal at convenient units of consumed utility. Since most utility meters will be metering a quantity that can be termed "energy," the electrical signals provided by the slightly modified utility meter may be considered to be equivalent to units of "energy" (kilowatt hours of electricity, cubic feet of gas, etc.). However, in such applications as pay television, the units may be simply "hours." The electrical signals are provided to an accumulator or storage means stationed at the utility user's location and usually placed within the dwelling, if the user's location be a house, proximate to the utility meter. For example, if the meter is stationed at the user's location exterior of a dwelling, the accumulator or storage device may be positioned in the interior of the dwelling at a position on the opposite side of the wall to which the utility meter is secured. The accumulation of electrical signals may be accomplished either electronically or mechanically. An electrical timer is provided and is used to provide a timing signal at intervals predetermined by the utility company. In most instances, this interval will be thirty days. A printing means, such as a mechanical printer or an electronic static printer, is connected to both the storage means and the timing means for receiving signals from both. Since the signals provided to the storage means or accumulator by the utility meter will be in units such as energy, a translation is necessary into the monetary value of each of these units. For example, if the utility meter is a kilowatt hour meter, the signals may be provided upon the measure of each kilowatt hour. The value of the kilowatt hour may be two cents and the storage means, thus storing an indication of units of energy, may also be considered storing the monetary value of the energy consumed. In some instances, as will become more apparent hereinafter, a decoder or translator may effectively be used to translate or decode the energy information into monetary information; further, if a mechanical print wheel mechanism is used, the storage means or accumulator may be combined with the printing means.

When the printer receives a signal from the timer at the predetermined interval, the contents of the accumulator are printed on a document stored integrally with the printer. The printed document is ejected from the printer and provided to the user. A permanent record is contained within the printer and the printed document provided to the utility user is in duplicate to provide him with a record copy and a copy to be mailed with his remittance indicated as due by the printed document. To advise the user of the presence of the printed document, an indicator is actuated; the indicator may take the form of a lamp that is ignited and remains ignited until the document is removed from the printer. Since the system of the present invention will continue to operate even though the document is not removed from the printer, it is also convenient to include an alarm system that, operating from the previously described timer, will time a period (usually three days) after which an audible alarm is sounded after the printing of the bill.

The present invention may more readily be described by reference to the accompanying drawings in which:

FIGURE 2a is an enlargement of a portion of FIGURE 2.

Figure 2:
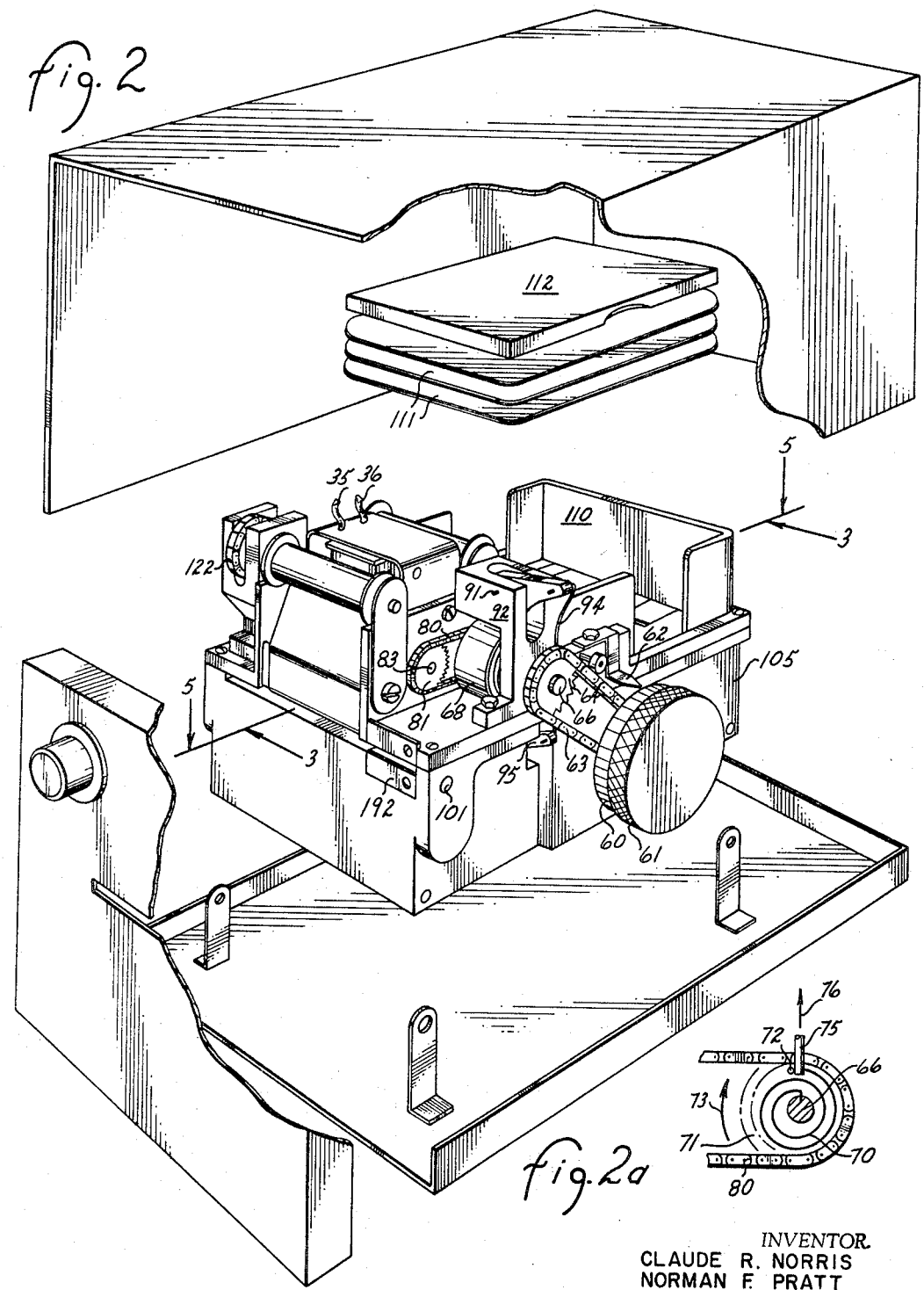
FIGURE 2 is a partially exploded perspective view of an electromechanical embodiment of the system of the present invention.
Figure 5B:
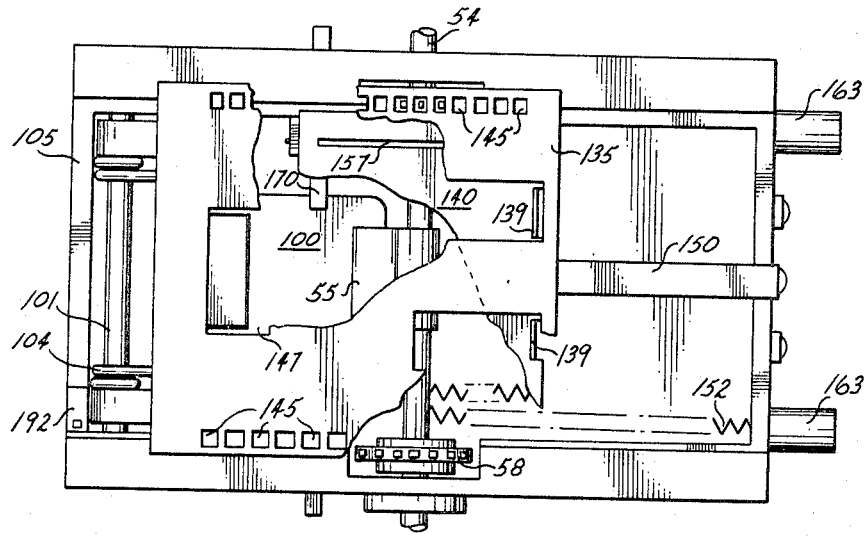
Figure 5A:
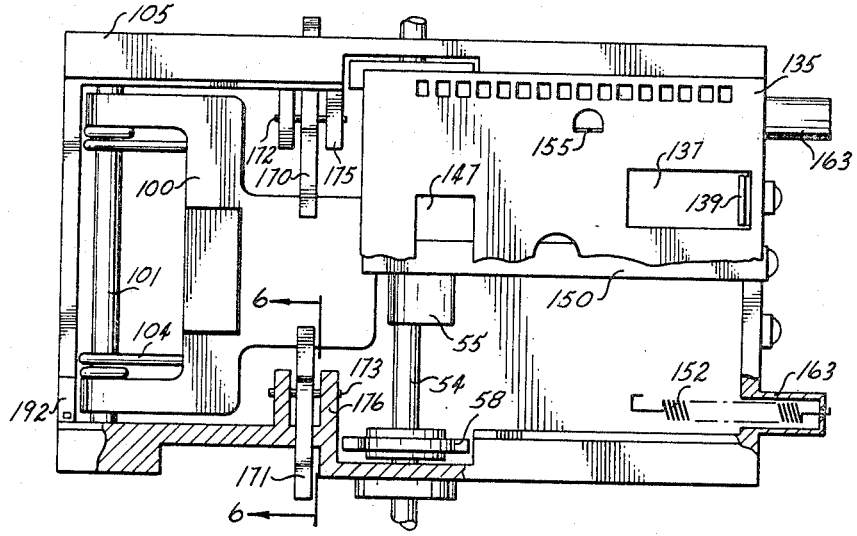

FIGURES 5a, 5b, and 5c are plan views of the document feeding mechanism of FIGURE 2 useful for illustrating the operation of the embodiment of FIGURE 2.

FIGURES 6a, 6b, and 6c are partial cross-sectional views taken along line 6—6 of FIGURE 5b and useful for illustrating the sequence of operation of the embodiment of FIGURE 2.

FIGURE 7 is a schematic illustration showing the mechanical relationship and a circuit diagram for operating the indicator and alarm systems of the present invention.

Figures 8, 9:
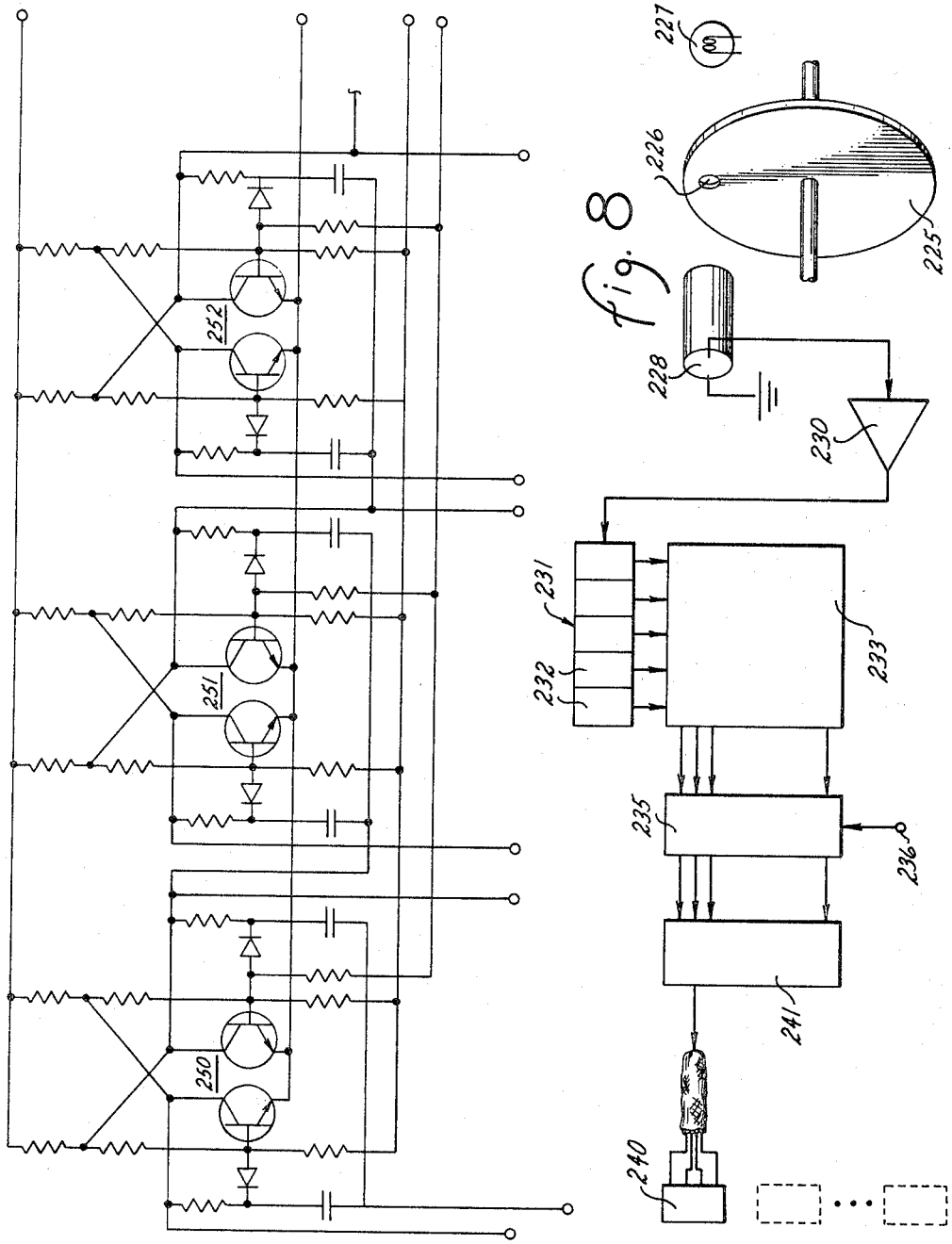

FIGURE 8 is a schematic illustration of another embodiment of the present invention.

FIGURE 9 is a schematic circuit digram showing a suitable counter circuit for use in the schematic diagram of FIGURE 8.

Figure 10:
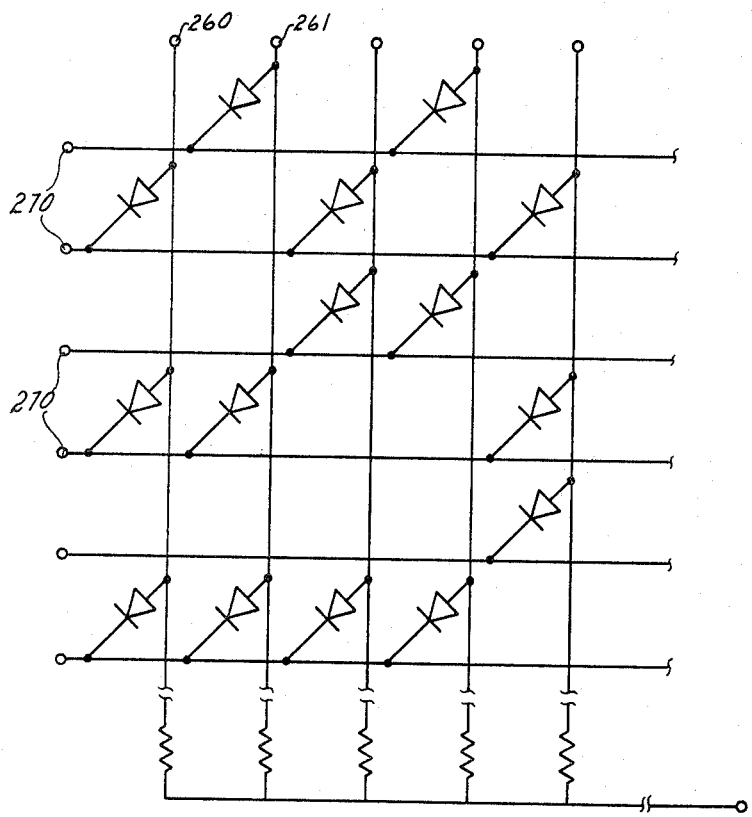

FIGURE 10 is a schematic circuit diagram of a diode matrix suitable for use as a decoder and pattern generator in the schematic diagram of FIGURE 8.

Figures 11, 12:
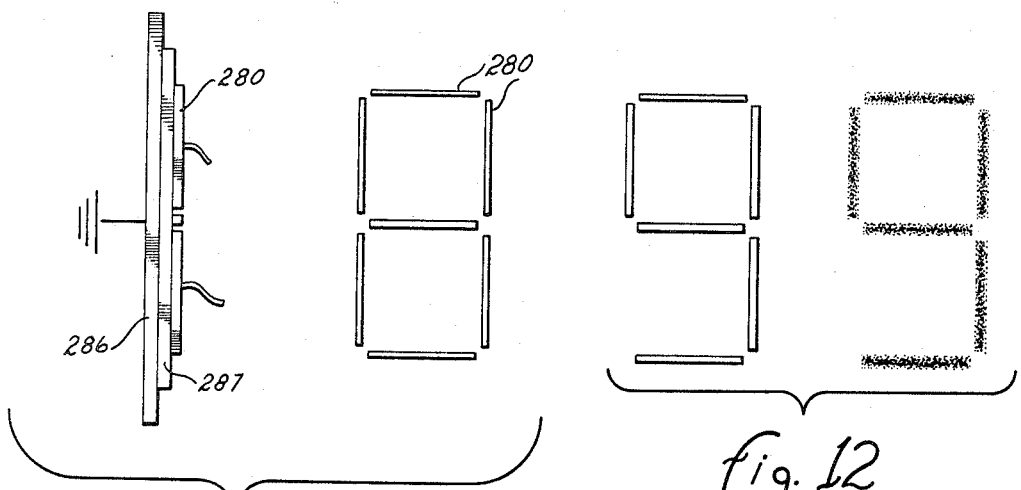

FIGURE 11 is an illustration of a segmented digit of a digit matrix showing the manner of printing in the embodiment of FIGURE 8.

FIGURE 12 is an illustration of a digit matrix and a segmented numeral printed thereby useful for describing the operation of the system of FIGURE 8.

Figure 1:
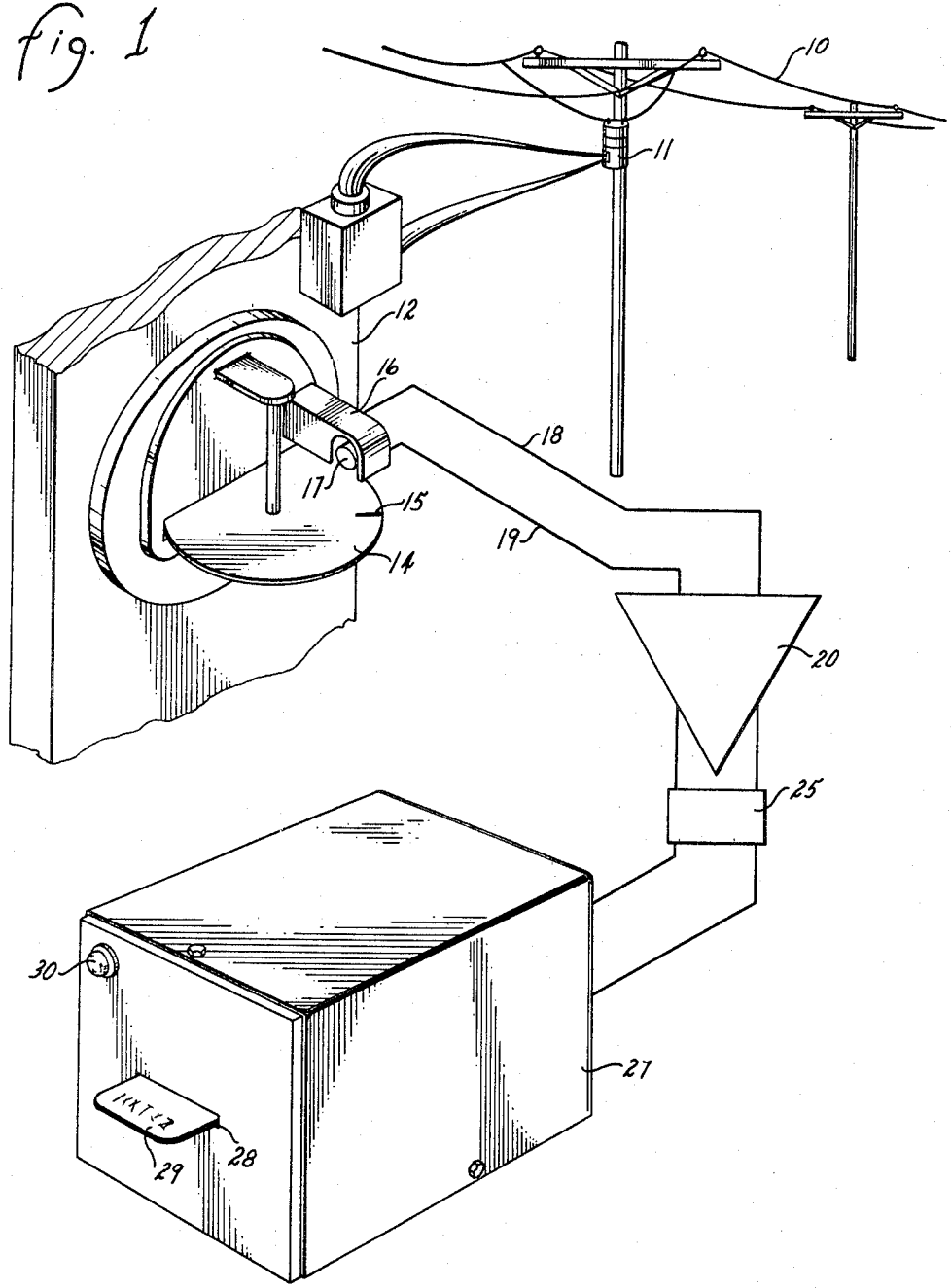
FIGURE 1 is a schematic illustration of the system of the present invention useful for describing the environment in which the invention is to operate.

Referring to FIGURE 1, the present embodiment will be described in terms of an electrical power system, it being understood that the system is equally applicable to other forms of utility dissemination where a periodic billing to the utilities user is required. Electrical energy is provided to the utilities user through the conventional power lines 10 and power transformer 11. The connection to the user's location from the transformer 11 is through a modified utility meter 12 which, in the instance chosen for illustration, is a watthour meter. For brevity and only to indicate the environment in which the present invention is intended to operate, the utility meter shown in FIGURE 1 has been greatly simplified. The conventional rotating disc 14 has been provided with a reflecting line 15 positioned adjacent the periphery thereof and arranged to reflect light from a lamp (not shown) mounted in the vicinty of the mounting device 16. Light reflected by the line 15 is sensed by a photoelectric cell 17 to thereby provide an electrical signal via conductors 18 and 19. The signal is amplified in a conventional manner and, in the illustration of FIGURE 1, amplification is schematically illustrated through the utilization of an amplifying device characterized by the triangular symbol 20. In most practical applications, the utility meter 12 will be modified so that the rotation of the kilowatt hour disc is sensed and the resulting electrical signal derived therefrom will be a signal representing the useage of one kilowatt hour. In the simplified form shown in FIGURE 1, the electrical signal derived from the photoelectric device 17 will represent only a fraction of a kilowatt hour since the disc 14 must make several rotations for each kilowatt hour. Accordingly, in the simplified arrangement of FIGURE 1, a device for accumulating an indication of the number of electrical signals received is required so that the signals provided to the storage device of the present invention occur only when a kilowatt hour has been consumed. Accordingly, a divider 25 is shown receiving the amplified signals from the amplifier 20. The divider may simply be a conventional electrical counter that will count the number of revolutions of the disc 14 and provide an output signal when sufficient rotations have occurred to indicate that a kilowatt hour has been consumed. The divider 25 will usually be an integral part of the accumulator to be described.

A storage device or accumulator, a timing device, and a printer are all contained within an enclosure 27 that also contains a supply of print forms to ultimately be used to print the monetary value of the utilties consumed during the preceding predetermined timed interval. The simplified illustration of FIGURE 1 shows the enclosure 27 as a simple "black box" having an opening 28 therein to permit printed utility bills such as that shown at 29 to be expelled from the system. A warning light 30 is also shown that will be energized when the utility bill 29 extends outwardly of the enclosure 27.

Figure 3:
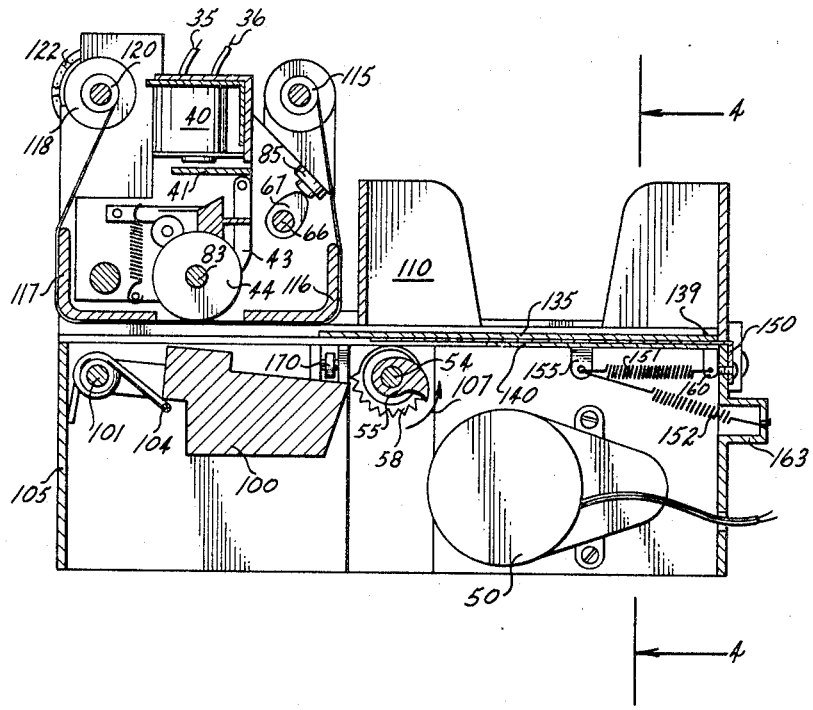
FIGURE 3 is a sectional view of FIGURE 2 taken along line 3—3.
Figure 4:
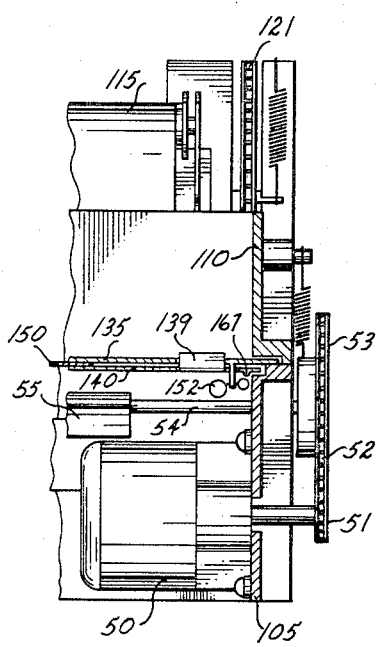
FIGURE 4 is a partial sectional view of FIGURE 3 taken along line 4—4.

Since the utility meter may readily be modified to provide an electrical signal for each kilowatt hour consumed, or for any particular unit of energy consumed, the electrical signals provided to the enclosure 27 will be assumed to be of sufficient strength and represent an appropriate unit of consumed energy. Referring now to FIGURES 2, 3, and 4, a partially exploded view of a portion of one embodiment of the present invention is shown together with selected cross-sectional views thereof. The electrical signals provided by the modified utility meter are received by the portion of the invention shown in FIGURES 2–4 via conductors 35 and 36. Each signal thus received energizes a solenoid 40 that draws an armature 41 thereto and results in the actuation of a conventional ratchet and pawl mechanism 43. The ratchet and pawl mechanism is a conventional decimal counter including digit wheels 44 each containing the digits 0–9 positioned about the periphery thereof. Each of the wheels 44 comprises a print wheel that will ultimately be used to print the utility user's bill. The respective print wheels are advanced in a conventional decimal counter fashion in much the same way that an automobile odometer is advanced. Each actuation of the ratchet and pawl mechanism through the energization of a solenoid 40 results in advancing the least significant digit an amount determined by the monetary value of the unit of energy represented by the electrical signal. For example, if each electrical signal represented a kilowatt hour of electrical energy, and if the current rate were two cents per kilowatt hour, the energization of the solenoid 40, and the accompanying advance of the least significant print wheel through the operation of the ratchet and pawl mechanism, would advance the least significant wheel two digits. The print wheel mechanism would then advance at two cent intervals; alternatively, the ratchet and pawl mechanism may be selected to advance the least significant digit more or less than two digits per energization of the solenoid in accordance with the existing utility rate. An electrical timing motor 50 is positioned to drive a sprocket 51 which, through the expediency of a chain drive 52, drives sprocket 53. The timing motor may be connected to a conventional 110 volt source of power. In some applications, it is necessary to power the timer by other means such as by batteries. The sprocket 53 is keyed to a shaft 54 supporting a cam 55 for cocking and releasing the print hammer. The shaft 54 also drives document-advance sprockets 58 in a manner to be described more fully hereinafter. The end of shaft 54 remote from the sprocket 53 is keyed to an indicator dial 60 integral with a knurled knob 61. A pointer 62 permits the knob 61 to be rotated to a predetermined position in accordance with the markings on the indicator dial 60. The indicator also includes an integral sprocket (not shown) that drives a chain 63 and sprocket 64. The sprocket 64 is keyed to a shaft 66 that extends substantially the width of the device and which drives an alarm cam 67 and a reset mechanism shown generally at 68. The reset mechanism is shown more clearly in FIGURE 2a wherein it may be seen that the shaft 66 drives a helical spring 70 having one end keyed to the shaft 66 and the other end secured to a sprocket 61. The sprocket 71 is slidably mounted on the shaft 66 so that it is free to rotate about the axis defined by the shaft. The point of attachment between the spring 70 and the sprocket 71 consists of a pin or dowel 72 that extends outwardly from the sprocket 71 generally in a direction parallel to the axis of the shaft 66. The shaft 66 will be rotated in a direction indicated by the arrow 73 and will thus cause the coil spring to be "wound" with the pin 72 forced against a stop 75. When the stop 75 is raised in a direction indicated by the arrow 76, the spring "unwinds" and thus rotates the sprocket 71. The sprocket drives a chain 80 that may be seen in both FIGURES 2 and 2a; the chain 80 drives a sprocket 81 which is keyed to a shaft 83 which is used to reset the print wheels after the printing operation to prepare the device for accumulating the monetary value of the utility consumed by the user during the next interval or period.

The alarm cam engages the armature of a switch 85 to de-energize an alarm system in a manner to be described later. The cam 67 is positioned on the shaft 66 such that the cam surface will engage and operate the switch 85 at a predetermined interval after the print cycle has been completed. For example, if the device is to be used to print a bill at the end of thirty days, the cam may be so shaped and positioned on the shaft 66 that it will continuously operate the switch 85 for a period of approximately three days after the printing cycle is complete. If the document, previously partially expelled from the print mechanism, has not been completely removed by the user, the cam will move out of contact with the switch 85 and the switch will close to thereby energize an alarm.

The stop 75 forms an integral part of a pivoted arm 90 that pivots about a pin 91 extending through a supporting bridge 92. The arm 90 is connected by a lever 94 to an arm 95 so that when arm 95 is pivoted in a manner to be described later, the lever 94 will actuate the arm 90 and thus operate the stop 75 to disengage the pin 72 and permit the spring 70 to drive the sprocket 71.

Printing is accomplished by actuating a print hammer 100 that is pivoted about a shaft 101 and is driven against the print wheels 44 through the expediency of a spring 104 contacting the housing 105 at one end and contacting the hammer 100 at the other end thereof. The print hammer 100 is chosen to have an appropriate mass so that the reaction of the spring 104 will permit the hammer to pivot about the shaft 101 and strike the document to be printed and force the latter into engagement with the print wheels 44. The hammer 100 is shown in the rest position in FIGURE 3; the hammer is actuated by the cam 55 which, when rotated in the direction indicated by the arrow 107, engages the hammer and forces it against the spring 104. As the cam continues to rotate, it releases the hammer 100, which is then propelled about the shaft 101 by the force of the coiled spring 104 to thereby strike the print wheels 44 and print whatever digits are at that time opposing the print hammer.

A document well 110 is provided to receive a plurality of documents 111, each of which is to subsequently be fed to the printing mechanism and partially ejected from the unit. A weight 112 provides the necessary biasing to force the documents into contact with a document-feeding mechanism to be explained more fully hereinafter. Each of the documents 111 will generally comprise a plurality of sheets of paper having carbon paper interspersed therewith. It has been found most convenient to use a bottom layer of relatively stiff paper followed by a layer of carbon paper, a second sheet of paper of lighter weight than the first, and another layer of carbon-backed paper. In this manner, when the print hammer forces the document into contact with the print wheels, two copies of the resulting printed information are presented to the user; the first of these documents may be retained by the user for his records and the second forwarded to the utility company together with the remittance indicated as being due by the document. Each of the documents will normally contain preprinted information such as the meter number, the address of the meter (the user's address), and the month date. Since only one document will normally be printed for each month, the documents may be placed in the document well 110 in prearranged sequence such that the first document to be fed will be the next month and succeeding documents will be succeeding months. A suitable number of documents will be stored in the device; sixty or seventy documents represent an appropriate number since the device will usually be checked and maintained approximately once every five years and only sixty documents will therefore be necessary (the remaining documents in excess of sixty are provided in the event that circumstances prevent a routine maintenance check at the end of the prescribed five years). It will be obvious to those skilled in the art that other document storage means may be used; for example, the use of a roll of documents, perforated and preprinted, may be found to be more compact.

To provide a permanent continuous record of the amounts printed on the documents, a continuous roll of print tape 115 is mounted within the device and is threaded past tape guides 116 and 117 to a takeup roll 118. The tape may be pressure-sensitive such that no separate tape or inked ribbon is necessary or the tape may comprise a double layer, the first of which is an inked or carbon-inked ribbon and the second of which is the tape to be used to store the print matter. The takeup roll 118 is keyed to the shaft 120 which, in turn, is keyed to a sprocket 121. The sprocket 121 is driven by a chain 122 which then passes over another sprocket (not shown) keyed to the shaft 83. In this manner, when the print wheels 44 are reset through the actuation of the reset mechanism described in connection with FIGURE 2a, the tape 115 is advanced a sufficient distance to present an unprinted area to the print wheels for subsequent printings. The continuous record may be checked against received printed documents to verify the latter and to detect malfunctions or tampering.

The document well 110 is positioned to provide successive documents to a document-feeding mechanism. The document-feeding mechanism may best be described by reference to FIGURES 5a, 5b, and 5c, as well as FIGURES 3 and 4. A document-feed tray 135 is positioned immediately below the document well 110 and serves as a supporting surface for the documents in the document well. The document tray includes a pair of slots 137, each of which permits feed tabs 139 to extend therethrough. The feed tabs 139 are formed integral with a document feed plate 140. The document tray 135 also includes a plurality of sprocket openings 145 to receive the teeth of the document advance sprockets 58. The document tray also includes a hammer opening 147 of sufficient size to permit the hammer 100 to extend therethrough and force a document into contact with the print wheels. The document tray 135 and document-feed plate 140 are movable relative to each other in parallel horizontal planes and are spaced apart by a guide rail 150. Relative motion between the document tray and document-feed plate is controlled in part by two pair of springs 151 and 152. The springs 151 are attached to tabs 155 formed in the document tray 135 and extending through slots 157 provided in the document-feed plate 140. In the embodiment chosen for illustration, the tabs 155 are formed simply by punching an appropriately shaped portion out of the document tray and bending this stamped portion downwardly perpendicular to the plane formed by the tray. These tabs 155 are then extended through the slots 157 to permit the attachment of the springs 151 thereto. The opposite end of the springs 151 are secured to tabs 160 formed integral with the document-feed plate in a manner similar to the tabs 150. Thus, the document tray 135 and document-feed plate 140 may move relative to each other but are always urged into a specific position since the springs 151 are secured between tabs formed integral with the document tray and with the feed plate. The springs 152 are secured at one end to the tabs 155 and are secured at the opposite end to a spring well 163 to thereby urge the document tray to a retracted position as shown in FIGURE 3.

The document-feed plate 140 also includes a stop rail 167 that is used to control the relative motion between the document tray 135 and document feed plate 140. The stop rail 167 operates in conjunction with a pair of trigger cams 170 and 171. The cams 170 and 171 are each pivoted about an axis defined by pins 172 and 173 respectively. The pins extend through supporting arms 175 and 176 formed integral with the housing. The interaction of the cams 170 and 171 with the remainder of the mechanism may best be described by reference to FIGURES 6a, 6b, and 6c. In FIGURE 6a, the cam 171 is shown in its normal or rest position. The cam also includes a notch 180 which, as shown in FIGURE 6b, interferes with the extending motion of the document-feed plate since the latter includes the stop rail 167 which abuts the face of the cam 171. In both FIGURES 6a and 6b, the print hammer 100 is shown in its rest position; in FIGURE 6c, the print hammer has been "triggered" and has swung upwardly to force the document into contact with the print wheels. As the hammer swings upwardly, it engages the cam 171 and pivots the latter to thereby align the notch 180 with the stop rail 167 of the document-feed plate. The document-feed plate is then permitted to slide past the cam (in a direction perpendicular to the drawing of FIGURE 6c). When the print hammer returns to its rest position, and the document-feed plate is retracted to withdraw the stop rail 167 from the notch 180, the spring bias 184 connected to the lever 94 pivots the cam to its original rest position as shown in FIGURES 6a and 6b.

The relative motion between the document tray and document-feed plate is thus provided by the rotation of the document advance sprockets 58 whose teeth engage the openings 145 in the document tray. As the document tray is advanced toward the print mechanism, the document-feed plate follows since the feed plate is connected to the document tray through the spring 151. As the document tray and feed plate are being moved toward the print position, the cam 155 cocks the hammer 100 in preparation for the printing cycle. When the stop rails 167 of the document-feed plate engage the trigger cams 170 and 171, the document-feed plate is prevented from continuing its movement with the document tray. The relative motion between the document tray and document-feed plate results in the tensioning of the spring 151. The spring 152 has been tensioned since the initial movement of the document tray. When the document tray carries the document to the print position, the cam 155 releases the hammer 100 which then strikes the paper and forces it firmly against the print wheel 44. As the hammer swings upwardly against the print wheel 44, the hammer contacts the trigger cams 170 and 171 permitting the cams to rotate and thereby enabling the stop rails 167 to pass through the notches in the trigger cams. The tension of the spring 151 thus propels the document-feed plate so that the feed tabs 139 engage the document (having just been printed) and propels the latter to a position extending partially outwardly of the housing. The document advance sprockets 58 have meanwhile continued to rotate so that the smooth portion, or toothless portion, of the sprockets have come into position and the last tooth has passed out of the openings 145 in the document tray. The tension in the spring 152 then acts upon the document tray to retract the tray into its original or starting position. The sequence and inter-relationship of this feeding cycle may best be described by following the drawings of FIGURES 5a, 5b, and 5c. In FIGURE 5a, the document tray 135 and document-feed plate are shown in the rest position. As the sprocket 58 engages the openings in the document tray, it is advanced to the left together with the document-feed plate. As the document-feed plate is advanced to the left, the stop rails 167 engages the cams 170 and 171 and the relative motion between the document tray and the document-feed plate begins. In FIGURE 5b, the document tray 135 is shown approaching the print position (a position such that the opening 147 corresponds to the document-contacting area of the print hammer 100). It may be noted in FIGURE 5b that the document-feed plate has been held from further motion to the left and that the feed tabs 139 have been stationary and that the document tray openings or slots 137 have permitted the tabs to remain stationary while the document tray has moved forward. In FIGURE 5c, the cam 55 has engaged and released the print hammer and thus triggered the trigger cams 170 and 171 to permit the document-feed plate 140 to extend to the left. The feed tabs have thus engaged the document that has just been printed and has forced the document partially outward from the print mechanism. The cams 58 have rotated to a position such that the last sprocket tooth is disengaging the openings 145 to permit the document tray 135 to return to the position shown in FIGURE 5a.

The overall operation of the embodiment thus described may be given as follows. The device may be connected to the utility source such as a conventional electric power source, and the utility meter will thus begin measuring units of consumed electrical power. A supply of documents, in proper month chronological order, will be placed in the well 110, and the indicator 60 may be positioned to begin the month. The timing motor will provide the necessary power to rotate the cam 55 and the sprockets 58. The sprocket 64 will slowly wind the spring 70. As the sprockets 58 rotate, the teeth thereof will engage the openings in the document tray and the first document to be fed to the print mechanism will slowly be moved to the left as shown in the drawings. Each unit of electrical energy, such as a kilowatt hour, will energize the solenoid 40 and step the least significant print wheel an appropriate number of digits. As the end of the desired interval, usually thirty days, approaches, the cam 55 will have engaged the hammer 100 and cocked the latter into its spring-loaded position. The document tray will have been moved, together with a document, to the print position and the document-feed plate will have been stopped from further motion by the trigger cams 170 and 171. When the thirty-day period has expired, the cam 55 will rotate to the release position and the hammer 100 will swing upwardly forcing the document and permanent record tape 115 into firm contact with the print wheels 44. The print hammer will also engage the trigger cams 170 and 171 to appropriately position the notches therein and permit the stop rails 167 of the document-feed plate to pass therethrough. The feed tabs 139 will thus rapidly engage the edge of the document and force the document approximately half-way out of the print mechanism. The continued rotation of the sprockets 58 will result in the disengagement of the last tooth thereon with the openings 145 in the document tray 135, and the document tray and document-feed plate will be withdrawn to the original starting position. When the hammer 100 engages the trigger cam 171, the lever 94 will be forced downwardly and, in turn, will cause the arm 90 to move downwardly about its pivot 91. The stop 75, integral with the arm 90, will thus be raised in the direction indicated by the arrow 76. The spring 70, having been wound by the previous thirty days' slow winding and movement of the shaft 66, will thus be permitted to "unwind" and the sprocket 80 will therefore drive the sprocket 81 and the shaft 83. The shaft 83 rotating in the forward direction as shown in FIGURES 2 and 2a will result in the resetting of the print wheels 44 to initiate the accumulation of a new value for the next interval of measurement. When the trigger cam 171 returns to its initial position through the expediency of the bias provided thereto by the spring 184, the stop 175 will return to the position shown in FIGURE 2a to prevent further movement of the pin 72 and to thereby permit the spring 70 to be wound during the next timed interval.

The operation of the indicator and alarm systems may best be seen by reference to FIGURE 7 wherein it may be seen that a microswitch schematically shown at 191 includes an arm 192 extending into the path of travel of the printed document 193. The switch 191 interrupts current provided to terminals 194 and 195. When the switch 192 is closed, current is provided to an indicator lamp 198 mounted in an opening in the housing 105 and covered by an appropriately colored plastic shield 200. When the switch 192 is closed, power is also supplied to an alarm device such as a buzzer or bell 202; however, switch 85 is connected in series with the alarm device 202 and, when the latter is open, the alarm device 202 cannot be energized even though the switch 192 is closed. The switch 85 is actuated through the expediency of a cam 67 which rotates as indicated in connection with the discussion of the switch 85, cam 67 and shaft 66 of FIGURE 3. Thus, when the document 193 is partially expelled from the print mechanism as described above, the document will close the switch 192, thus providing power to the lamp 198 to ignite the latter. Voltage will also be applied to the series circuit comprising the alarm device 202 and the switch 85. Since the cam 67 is designed so that it will open the switch 85 when the document is printed and partially expelled from the print mechanism, the alarm device will not be energized. However, if the document 193 is not removed from the mechanism (thereby reopening switch 192) after a predetermined period such as three days, the cam 67 will have continued to rotate such that the switch 85 is closed. Upon closing of the switch 85, and the continued closed position of the switch 92 through the presence of the document 193, the alarm 202 will be energized and will continue to be energized until the document 193 is removed.

Referring to FIGURE 8, another embodiment of the present invention is indicated in schematic form. In the previously described embodiment, electromechanical units were used throughout the system; however, in many instances it may be more advantageous to use electronic components to both reduce the cost and the size of the unit. In FIGURE 8, the embodiment is shown in schematic block form and will be shown in greater detail in succeeding figures. As with the preceding embodiment, for purposes of illustration, it will be assumed that the utility being measured and billed is electrical power. The indicator on the electric utility meter corresponding to a kilowatt hour is shown schematically in FIGURE 8 at 225 and includes an opening therein 226. A lamp or other light source 227 is positioned behind the wheel and, when the opening 226 is aligned therewith, the light emanating from the light source 227 falls upon a photoelectric cell 228. The signal thus generated by the photoelectric cell 228 is first amplified in an amplifying device 230 and supplied to a counter 231. The counter may be of a conventional binary or decimal coded binary counter configuration and will usually include a plurality of stages 232 each interconnected with the remaining stages and each having a unique output. The output from the counter is provided to a decode network to change the contents of the counter from a mere indication of the number of pulses received to a storage of the indication of the monetary value of the number of pulses received. The decode network 233 will thus act as an integral part of the counter 231 to form a storage means for storing the monetary value of the units corresponding to each electrical signal provided to a counter. The contents of the counter translated by the decode network may also be electrically printed rather than printing through an electromechanical fashion. A convenient means of achieving such printing is through the utilization of a pattern generator 235 to receive signals from the decode network and also to receive a master timing signal applied, as shown in FIGURE 8, to the terminal 236. The timing signal may conveniently be generated in a fashion described previously in connection with the embodiment shown in the preceding figures. The application of the timing signals to the terminal 236 will permit the pattern generator 234 to "dump" the contents of the counter through the decode network 233 to an electric printing apparatus including digit matrices such as the digit matrix 240 driven by a matrix driver 241.

Referring to FIGURE 9, a typical counter is shown suitable for use in the counter application shown at 231 in FIGURE 8. The counter comprises a plurality of stages 250, 251, 252, . . . , each including a pair of cross-coupled transistors connected in bistable configuration. It is unnecessary to discuss the counter in detail since such circuits are well-known in the art, and may be reviewed by reference to any standard text on circuit design.

Referring to FIGURE 10, a decode network is shown suitable for use as a decode network in FIGURE 8. The decode network of FIGURE 10 comprises a conventional diode matrix having a plurality of input terminals 260, 261, etc., each connecting to an output conductor from the counter of FIGURE 9. The output terminals 270 of the decode matrix are connected to the input terminals through a predetermined array of diodes poled to permit current to pass in a specific direction. Thus, for example, the existence of a given bistable condition in stage 250 of the counter of FIGURE 9 will result in a particular voltage level applied to the terminal 260 of the diode matrix of FIGURE 10. The terminal 260 is connected to three of the terminals 270 through three corresponding diodes and the high voltage presented to the terminal 260 will result in a correspondingly high voltage delivered to the selected terminals 270. The decode network of FIGURE 10 in most applications, will be made removable such as by providing a printed circuit plug board readily removable from the remainder of the apparatus. The removable decode network will thus permit alternation of the system to accommodate great changes since a supplemented decode network will, in effect, result in the storage of a different monetary value for each unit represented by a signal delivered to the counter 231 of FIGURE 8.

The pattern generator 235 of FIGURE 8 will also usually take the form of a diode matrix such as that shown in FIGURE 10. In many instances, both the pattern generator and the decode network may be combined into a single diode matrix. While the purpose of the diode decode network is to translate the unit information in the counter 231 into its corresponding monetary value, the pattern generator is intended to decode or translate that information from whatever code the counter uses into a plurality of signals grouped into patterns corresponding to a digit. The function of the pattern generator will become more apparent with the description of the digit matrix. The digit matrix 240 is described in greater detail in connection with FIGURES 11 and 12. The matrix comprises a plurality of digit segments 280, each of which is connected through an electrical conductor to the matrix driver. The segments 280 are supported in a square array or matrix above a grounded metal plate 286. The document to be printed is fed or placed between the segments 280 and the plate 286 such as shown in FIGURE 11 at 287. The configuration to be printed on the document corresponding to the desired digit is effectively "burned" into the paper in a manner well known in the electrical printing art. The paper is voltage-sensitive, and the existence of a voltage between a segment and the grounded plate results in an impression on the paper corresponding to the configuration of the segment such as the plurality of segments forming the digit "9" as shown in FIGURE 12.

The operation of the embodiment shown in FIGURE 8 may be described as follows. Electrical power is provided to the utility meter and upon each rotation of the kilowatt hour disc, light from the lamp 227 falls upon the photoelectric device 228, thus generating an electrical signal. This signal is amplified by conventional means and applied to a signal counter 231. The counter counts, for example, in straight binary code (or perhaps more effectively in Grey code) and continuously presents the status of the count to a decode network. The decode network, selectively energized by the counter, continuously presents potential or voltage levels at the output terminals thereof corresponding to the monetary value of the total unit count contained in the counter. A pattern generator receives these voltage levels and, upon receipt of a timing signal generated by a timing signal device of the type described in connection with the previous embodiment, will cause the gating of voltage levels from the decode network and pattern generator through the matrix driver to selected segments in each digit matrix. The voltages applied to the selected segments results in the electrical printing of the monetary value of the utilities consumed during the previous timed interval. The mechanism for feeding documents is essentially the same as that described in connection with the first embodiment, the present embodiment being chosen as an illustration of the application of more modern solid state circuitry with the concomitant bulk and price saving to a system constructed in accordance with the teachings of the present invention.

The present system for automatically billing utilities users thereby provides a convenient means for presenting the user with a bill at predetermined intervals without the intervention of a meter reader. The savings in both time and money provided by the system of the present invention greater alleviates the difficulties encountered in the bulk of the paperwork and confusion caused by the rapid expansion of utility consumption using archaic methods for billing. The system of the present invention contemplates the periodic visitation by a repairman or maintenance man from the utility company to replace the permanent record tape and replenish the supply of documents; however, the period of visitation may be five years or longer and the visit will not impede the continuous operation of the automatic billing system. While the present invention has been described in terms of two specific embodiments, it will be understood by those skilled in the art that a wide range of equivalent embodiments may be used without departing from the spirit and scope thereof.

We claim:

1. An automatic utilities billing system comprising: a utility meter stationed at a utilities user's location for continuously measuring units of the utility being consumed by the user; means integral with said utility meter responsive to each unit measured by said utility meter for generating an electrical signal; storage means comprising an electronic counter having a plurality of stages, stationed in said utilities user's location and connected to said utility meter, responsive to said electrical signal for storing an indication of the receipt of said electrical signal; a decoding matrix connected to said storage means for changing said indication of the receipt of the electrical signal to an indication of the monetary value of said electrical signal; timing means, stationed at said utilities user's location, for generating a timing signal at predetermined intervals; printing means, stationed at said utilities user's location and connected to said storage means, responsive to said timing signal for printing the monetary value the indication of which is stored in said storage means.

2. An automatic utilities billing system comprising: a utility meter stationed at a utilities user's location for continuously measuring units of the utility being consumed by the user; means integral with said utility meter responsive to each unit measured by said utility meter for generating an electrical signal; storage means comprising an electronic counter having a plurality of interconnected bi-stable stages, each stage also being connected to a decoding matrix, stationed at said utilities user's location and connected to said utility meter, responsive to said electrical signal for storing an indication of the monetary value of the unit corresponding to said electrical signal; timing means, stationed at said utilities user's location, for generating a timing signal at predetermined intervals; printing means, stationed at said utilities user's location and connected to said storage means, responsive to said timing signal for printing the monetary value the indication of which is stored in said storage means; a document storage well for storing a plurality of documents; and document feeding means proximate said storage well and said printing means for transferring individual documents from said storage well to said printing means.

3. An automatic utilities billing system comprising: a utility meter stationed at a utilities user's location for continuously measuring units of the utility being consumed by the user; means integral with said utility meter responsive to each unit measured by said utility meter for generating an electrical signal; storage means comprising an electronic counter having a plurality of interconnected bi-stable stages, each stage also being connected to a decoding matrix, stationed at said utilities user's location and connected to said utility meter, responsive to said electrical signal for storing an indication of the monetary value of the unit corresponding to said electrical signal; timing means, stationed at said utilities user's location, for generating a timing signal at predetermined intervals; printing means, stationed at said utilities user's location and connected to said storage means, responsive to said timing signal for printing the monetary value, the indication of which is stored in said storage means; a document storage well for storing a plurality of documents; document feeding means proximate said storage well and said printing means for transferring individual documents from said storage well to said printing means; switch means connected to an indicator and positioned to sense the existence of a document in said printing means for energizing said indicator in response to the existence of said document; and a permanent record tape mounted proximate said printing means, and tape advance means responsive to the printing of said printing means for positioning an unprinted portion of tape to be printed at the next operation of said printing means.

References Cited

UNITED STATES PATENTS

| | | | |
|---|---|---|---|
| 1,434,339 | 10/1922 | Gustafsson | 346—14 |
| 2,117,653 | 5/1938 | Clifton et al. | 346—67 X |
| 2,414,821 | 1/1947 | Levy et al. | 346—98 |
| 3,038,158 | 6/1962 | Allen et al. | 346—14 X |
| 3,118,721 | 1/1964 | Exline | 346—14 |
| 3,129,322 | 4/1964 | Sarrott | 346—14 X |
| 3,311,824 | 3/1967 | Pitt | 324—103 |

FOREIGN PATENTS 470,470    8/1937    Great Britain.

RICHARD B. WILKINSON, *Primary Examiner.*

JOSEPH W. HARTARY, *Assistant Examiner.*